US009227555B2

(12) United States Patent
Kalapodas

(10) Patent No.: US 9,227,555 B2
(45) Date of Patent: Jan. 5, 2016

(54) ADAPTIVE EXTERNAL VEHICLE ILLUMINATION SYSTEM

(75) Inventor: Dramos I. Kalapodas, Rexville, NY (US)

(73) Assignee: IP CONSULTING LLC, Pompano Beach, FL (US)

( * ) Notice: Subject to any disclaimer, the term of this patent is extended or adjusted under 35 U.S.C. 154(b) by 224 days.

(21) Appl. No.: 13/431,675

(22) Filed: Mar. 27, 2012

(65) Prior Publication Data

US 2013/0258688 A1 Oct. 3, 2013

(51) Int. Cl.
*B60Q 1/08* (2006.01)
*B60Q 1/14* (2006.01)

(52) U.S. Cl.
CPC .............. *B60Q 1/143* (2013.01); *B60Q 1/085* (2013.01); *B60Q 2300/112* (2013.01); *B60Q 2300/114* (2013.01); *B60Q 2300/134* (2013.01); *B60Q 2300/42* (2013.01)

(58) Field of Classification Search
CPC ........ G01S 13/931; B60Q 1/04; B60Q 1/143; B60Q 1/085; B60Q 2300/112; B60Q 2300/134; B60Q 2300/114; B60Q 2300/42; F21Y 2101/02; F21S 48/1154; F21S 48/1163; F21S 4/003; H01L 25/0753; H01L 33/08; H01L 33/50; F21V 7/048; A61B 1/06; A61B 2562/146; A61B 5/1079; A61B 5/1455; A61B 8/4411; A47G 2019/2238; B01L 2300/168; B23K 26/0815; F21K 9/56; F24F 11/0009; G01N 21/8806; G01N 21/95692; G01T 1/243; G02B 26/0825; G03F 7/70233; G06K 9/209; G06T 2207/30236; G06T 7/0057; G09B 19/167; G09B 2013/222; H01S 3/0941; H05K 1/0274
USPC ......... 362/475, 507, 514, 519, 517, 518, 520, 362/521, 522, 538, 543, 544, 545, 548, 465, 362/231, 240, 84; 340/901; 428/116; 257/E25.02; 175/40; 356/445, 601
See application file for complete search history.

(56) References Cited

U.S. PATENT DOCUMENTS

| 7,416,324 B1* | 8/2008 | Tessnow et al. | 362/545 |
| 7,550,935 B2* | 6/2009 | Lys et al. | 315/318 |
| 7,566,155 B2* | 7/2009 | Schug et al. | 362/545 |
| 2003/0227774 A1* | 12/2003 | Martin et al. | 362/240 |

* cited by examiner

*Primary Examiner* — Stephen F Husar
*Assistant Examiner* — Danielle Allen
(74) *Attorney, Agent, or Firm* — Arthur E. Holmer

(57) ABSTRACT

An asymmetric geometry headlamp for vehicular use is built as a multifaceted three dimensional body which has multiple light emitting devices (LEDs and/or laser emitters) installed on its angled facets, hence forming a multipurpose illumination apparatus within a single assembly which is designed to provide; a low beam with a wide illuminated area covering 2 PiSteradians, a high beam all position and signaling lights. A microprocessor based system runs real time, continuously adaptive control routines for day and night conditions and provides the electric signals necessary for the independent control of the luminous intensity, direction and color spectrum to each facet of the headlamp's LEDs (light emitting diodes) and for the high beam. Multiple photo-sensors, CCD or CMOS video cameras, position encoders and accelerometers provide the feedback signals used in the automation of all lighting functions in a system designed to completely replace the manual actuation of lights on vehicles.

3 Claims, 12 Drawing Sheets

ADAPTIVE EXTERNAL VEHICLE ILLUMINATION SYSTEM

SUMMARY OF INVENTION

The fundamental ideas behind this application had risen out of the necessity to find a design solution for the complex subject of vehicular lighting devices which until present remain manually controlled with relatively poor performance results in respect to the forward direction and around curve visibility, back-dazzle and incoming traffic blinding effects. This application comprises of a microprocessor controlled headlight system providing adaptive output response of all illumination parameters as they are defined by luminous intensity, distribution of the luminous flux needed to create the optimum road illumination patterns, by the direction of illumination as well as the necessity to change the emitters' radiated spectrum for improved visibility and for signaling purpose.

The light emitters assembled on the facets of an asymmetric geometrical structure are and spatially disposed as to generate a wide distribution of the light vectors and to emit a spatial diffuse light with multiple adaptive directional vector component patterns, and being under the control of a microprocessor or a plurality of microcontrollers. This form of light distribution allows the realization of multidirectional radiant source, with variable luminous flux and illumination, which is integrated over all the directions of a solid angle or $2\pi$ Steradians.

The control system is designed to automatically respond to the external light conditions and relies on electronic feedback signals received from photo-sensors or video input, angular position encoders, accelerometers and other sensors which are aiding in the driver's action for lights switching hence providing improved driving comfort and safety. National SAE and international ECE standards and regulations for installation and performance of motor vehicle lighting were followed in this design, as they are stipulated by the Federal Motor Vehicle Safety Standard No. 108 which also incorporates SAE technical recommendations for North America and Canada. These regulations require an asymmetrical low beam oriented downward (low light on the left side of road) and a symmetrical narrow high beam focused slightly to the right side of the road.

This LED/Laser vehicle illumination system is designed as a one-in all headlamp and signaling unit that delivers a low beam of light, a high beam with reduced blinding effect to the opposite traffic and provide colored (yellow/orange spectrum) direction signal lights or red for vehicular hazard warning signals. These signaling functions are achieved with or without auxiliary emitter components by changing the emission spectrum of the already present LEDs situated on the Left and Right side of the headlamp assembly. The headlamp presented in this application is also equipped with upright light control to reduce back-dazzle while allowing for road sign reading, and will illuminate the curved roads ahead prior to engaging the turn and without diminishing the forward visibility and without involving the work of any electromechanical motion devices. Unlike the traditional manual lights switching from one beam state to another (low to high or high to low beam), the herein system introduces an adaptive light control principle which automatically adjusts its output parameters of luminous intensity and directivity as it is dictated by input parameters of ambient light, the incoming traffic lights, the intended direction of travel or by the overall roadside illumination conditions. Voice activated light control functions may be implemented in the microprocessor firmware.

INVENTION BACKGROUND

In the present market, the design of the vehicular (automotive) headlamps may be characterized by fixed emitting fixtures presenting a fixed luminous intensity with unidirectional orientation of the main light rays (vectors). The photoelectric characteristics of these headlamps are controlled manually which in fact adds to the burden of night driving, increasing driver's response time to avoiding obstacles and reduces his perception in distinguishing shapes and the road topography due to the high contrast and penumbra effects created by such static design concepts. Due to the sudden change in road illumination intensity during high-low beam switching, there are seconds of blindness following this action which have negative results in driving performance and had proven to be a source of accidents. Prior art is basically oriented on limited initial illumination and relies on increasing the frontal and side luminosity accordingly with the external the light conditions, in other words it starts at the low point of illumination and adjusts it higher as needed.

This application introduces a new concept where initially all light emitting devices provide full frontal and side illumination over a wide angle of visibility pattern which is further controlled and adapted to respond to the exterior light conditions by diminishing the initial intensity and directional light parameters to lower levels.

Some more advanced designs include mechanized headlamps which respond to the driver's change of direction and improve the side and curve visibility and with variable intensity controls as presented in the following granted US patents; U.S. Pat. No. 7,950,837 B2—Yatsuda et al. May 2011, U.S. Pat. No. 7,815,352 B2—Naganawa et al. October 2010, U.S. Pat. No. 7,891,851 B2—Turhan, Alcelik Feb. 22, 2011, U.S. Pat. No. 6,504,265—Toda/2003, and U.S. Pat. No. 6,513,958—Ishikawa/2003.

Such headlamps are complex in their mechanical design, expensive to maintain or replace and have the main disadvantage of taking the front illumination and displacing it sideways which as result diminishes the forward illumination with unpredictable results. A view at the contemporary automotive control systems reveals that from navigation to brakes and many other driving functions or safety features are computer controlled while the vehicular illumination systems remain manually operated thus presenting a subjective rigid design with limited performance and presenting deficiencies which are no longer suitable for a modern vehicle. Novel systems are demanded by the market and in response a unique solution is presented in this application.

Prior art cited by the patents above are seeking an improved forward and side illumination pattern by using fixed or mobile light devices assembled on the same known planar surface and make use of electromechanical headlamp positioning systems or are using reflectors and light concentrators for directional lighting. Each system has its technological advantages which also encounters specific economical drawbacks.

The proposed application eliminates the need for mechanical actuation of the light emitting devices and proposes a three dimensional disposition of the light emitting devices (LEDs that could be supplemented by additional Laser devices) within the headlamp assembly which provides a wide spatial illumination. The herein system and method of illumination produces unconventional patterns of light with continuously adjusted parameters of intensity and direction. In other terms, this headlamp provides an initial full 2 PiSteradian of solid angle illumination in normal driving conditions in the absence of concomitant traffic and will adjust down its parameters to generate more restrictive patterns of illumination as it is determined by external illumination and traffic conditions, a concept nor perceived or anticipated by any of the prior art. Some prior art as in U.S. Pat. No. 8,080,942 Heider, is describing a dynamic, adaptive light control system of a planar construction comprising of supplemental light sources which are positioned at three different fixed angles and sharing location with a regular daytime running light module. It also presents a method of adaptive front lighting employing control techniques like device switching, PWM, dimming or other methods a priori existent in the public domain.

This application differentiates itself from these claims by bringing a novel and unobvious solutions by proposing a three-dimensional asymmetric principle of building a headlamp structure and by presenting a method of multidirectional light emission over a wide angle of view which automatically and continuously adapts its field of illumination in a multitude of overlapping patterns. Such geometrical structure is comprised of multiple polygonal shapes attached to a central polygonal shape at various and unequal angles. The upper facet shown in FIG. 3 makes an exception from this rule by having its angle of inclination oriented downward and forward for the purpose of creating the upper cut-off limit of illumination hence reducing the blinding effect to the incoming traffic and also reducing the glare created by dust, fog, rain, snow or other external conditions. Such design and method of illumination provides an economic design solution which is superior to technologies relying on an adjustable mirror-lens combination of elements arranged in various planar positions as described by the prior art.

The proposed physical design brings another original feature by including all the lighting required by a vehicle, within a single multifunctional embodiment which is using the same light emitting devices for multiple purposes by providing a continuously controlled low to high beam range of illumination, the signaling lights by changing the color spectrum of at least one of the existing LEDs and also provide position lights without raising the need for separate light devices or hardware.

The present application recognizes prior art elements in the pending application Ser. No. 12/422,284 which suggests its possible use in a vehicular illumination system. The concept of an asymmetric angular placement of various facets containing the light emitting devices is not presented in Ser. No. 12/422,284 which may not be foreseen as a possible method of automatic control or be presumed constructively as described in the present application.

Experimentation with various geometrical shapes and angle of distribution of the light emitted by LEDs and Laser sources lead to the conclusion that an asymmetric apparatus having a variable geometry that contains the emitting light sources positioned at predetermined angles produced a wide, uniform pattern of illumination. When individually controlled in intensity and direction, the combined light produced by the system created the best overall illumination patterns conforming with the vehicular illumination standards in effect.

Along with introducing the concept of angular displacement of the light sources in five or more directions of illumination ex., Up/Down/Left/Right and the Center for a selective directional emission of light rays, the herein application invokes an adaptive discrete control of light intensity and a switching algorithm of emitters, individually and in groups for an efficient electric power management and omnidirectional dispersion of light which can be selectively oriented. The light emitters assembled on the facets of the asymmetric geometrical structure are and spatially disposed as to generate a wide distribution of the light vectors and to emit a spatial diffuse light with multiple adaptive directional vector component patterns, and being under the control of a microprocessor or a plurality of microcontrollers. This form of light distribution allows the realization of a multidirectional radiant source, with variable luminous flux and illuminance, which is integrated over all the directions of a solid angle or $2\pi$ Steradians.

Having a radiometric analysis of the light emitting sources, the herein design saves electrical energy [Watt*Hour] thus increasing light efficacy through the emitters switching technique and through the PWM (Pulse Width Modulation) principles applied to each directional emitter-module (Left, Right, Up, Down and Center modules). From a photometric point of analysis the PWM controls the light intensity of each emitter-module and relies on the feedback signal delivered by the photo-sensors or cameras which in turn assures a maximum luminous intensity [lm] in the driving direction after compensating for the incoming traffic and surrounding light sources. In effect, such adaptive light control system is designed to minimize the glare while enhancing the quality of the allover illumination and therefore limiting the negative effects of the eye's difficulty to adapt to sudden light intensity changes.

This invention is focused on reducing drastic changes in the illumination levels (as encountered when changing from high beam to low beam) and produces constant illumination over the whole scene, issue not presently addressed by any of the headlamp devices. Illumination levels over the scene produced by traditional sources can contain either insufficient or over illuminated portions, phenomenon associated with a corresponding decrease in human reaction time due to the inertial effect on the eye receptors recovery called the after image effect. A much wider area of illumination provided by this design facilitates early detection of obstacles thus limiting the long term driving stress.

By controlling the left and right fields of illumination this design prevents the formation of direct glare (the presence of a bright light in the visual field) to the incoming traffic.

Some of the most important features of the present asymmetrical geometry concept applied to vehicle headlamps are; a) wide area of visibility over the shoulder and over curved roads without the aid of motion devices, b) elimination of the scotoma effect on the eye by extending the visibility in critical zones situated ahead and sideways.

Studies by Brebner and Welford, 1980 and Luce (1986) establish that the mean simple reaction (the acknowledgement of visual stimuli but without including a physical response time) is approximately 190 ms, while Eckner et all. (2010) determines it to be 268 ms. The average time calculated for the mean simple reaction from these studies is averaging at 229 ms, and it becomes even longer for images picked around the eye edges and at night time.

The human biological response time to light stimuli calculated from the moment of perception to the moment an image is created on the brain is called recognition reaction time and extends to approximately 384 ms, according to Eckner et. all study (2010).

If we consider that at the actual cruising speed of a vehicle is 65 MPH (or 104.6 Km/h) such vehicle will advance by a distance of 95.3 Ft (29.06 m/s) every second. Considering that the human recognition reaction time is approximately 384 ms (or 0.384 s), the distance the same vehicle will travel before the driver would have reacted to the visual stimuli is 36.59 Ft (11.15 m). This is equivalent with driving blind for 36.59 Ft, situation that could be only aggravated by a limited peripheral illumination delivered by the regular headlamp designs. An additional visual impediment is created by the fixed illumination field of the traditional headlamps which widely vary among manufacturers. Such negative effects are compensated for in this invention through the adoption of an adaptive illumination system that generates a wide view pattern which is selectively adjusted in intensity and direction without compromising luminosity via restrictive geometrical or optical methods.

The herein design addresses all the functional parameters of a vehicular headlamp and improves the overall visibility by producing five (in this application) or more independent adaptive illumination patterns, and extends the distance and angle of view through its automatic light intensity control which receives feedback from automotive ambient light sensors (ALS). The negative effects created by the time delayed human reaction is reduced in the herein design by constantly adjusting the forward and side illumination, hence allowing for early detection of obstacles which in turn results in a longer time to react and to higher road awareness with reduced driver fatigue. This invention proposes a multiple light emitting modules assembled on a number of geometrical facets of a headlamp, which facets are positioned at various angles measured from the center module/facet so that the light vectors (300) of the central module/facet are oriented forward, the Left and Right facets' vectors (200) are oriented sideways, and oriented downward for the Up and Down facets, as depicted in FIG. 8 (light vectors top view), and in FIG. 10 (light vectors side view).

This headlamp and signaling system relies on proprietary real-time microprocessor control routines, and a data acquisition unit running independent of the main vehicle computer and common interfacing is limited to displaying various functional states or malfunction of the illumination system on the vehicle monitor. A separate display monitor may be also provided for displaying the headlamp's operational status.

This concept of continuously adaptive lighting systems for vehicular applications originates with the necessity to increase the quality of illumination and to extend the field of visibility to approximately 2 Pi Steradians or even to full 4 Pi Steradians (a whole sphere) in special applications, having also the scope of eliminating spots of high intensity and penumbra and to provide a source of uniform illumination with wide spatial visibility and high detail throughout the whole scene under observation. The illumination pattern and intensity parameters of the headlamp are continuously controlled by a microprocessor/microcontroller system working to reduce the glare to the incoming traffic while enhancing the overall visibility.

The presented design may be integrated with other video electronic equipment employing high quality imaging applications as could be the case in 3-D viewing devices for commercial or military use.

The photo-sensors, video cameras, position encoders and accelerometers included in the system provide the input feedback signals for low/high beam lighting, for the directional pattern control of the emitted light rays without the necessity of any mechanical motion devices and also for the emitter color spectrum change.

In full operating mode, the area of illumination covers a solid angle of 2 Pi Sr. (2 Pi*Steradian), or an equivalent of 180° (planar Degrees) in a two dimension angular representation. During regular operation the luminous intensity and spatial coverage over a 2 Pi Sr., area is dynamically and continuously adjusted by electronic circuitry as it is dictated by the surrounding illumination characteristics. This new adaptive control concept when applied in vehicular headlamp design produces constant luminosity of the road ahead, reduces the eye strain while revealing a considerably improved view of details. The automatically controlled wide angle illumination pattern guarantees visibility around the curve prior to taking the turn without affecting the front visibility.

During the daytime use, the headlights are dimmed to a low level by the PWM (Pulse Width Modulation) signal applied to the LED's driver circuits upon comparing the environment light to a threshold which is electronically set and may be also manually adjusted.

The signaling for direction change is provided by the same emitter devices assembled on the left and right geometrical facets of the headlamp by changing their radiation spectrum to approximately 540 nm wavelength corresponding to a yellow/orange light, spectral change that may be also generated by choosing individual multi-pin colored LEDs activated by electrical polarity reversal or by using RGBY color type of LED emitters.

A distress red light signal of approximately 650 nm wavelength is generated by the same means of color change as in the previously described principles, a red flashing light which will automatically be triggered by the accelerometer sensors when the vehicle speed is suddenly reduced from high to a lower level or when the cruising speed is reduced below 40-45 mph.

DETAILED DESCRIPTION OF THE INVENTION

A vehicle headlamp system and method, built as a three-dimensional body structure shaped-out like a flower (FIG. 1) having multiple polygonal facets (petals like) attached to a central polygonal facet and positioned at various asymmetric angles in respect to the normal to the central facet orientation as shown in (FIG. 2) and (FIG. 3). The facets surfaces may be planar or curved in shape. The light emitting devices are assembled on the surface of each facet. At least one facet has its angle of orientation in opposite direction with all the other facets as seen in FIG. 2 and FIG. 3. The remaining facets may be individually positioned at various angles in respect to the central facet and in respect to each other so that a completely asymmetric support structure for the light emitting devices is formed. This structure is housed in an enclosure that may have optically reflective properties and has a transparent cover of low refractive indices in front. The upper facet is oriented downward (or forward) while the down, left and right facets are positioned at independent angles to each other and in relation with the central facet for the purpose of accommodating various vehicular design styles and also allow for various initial patterns of illumination. The facets will retain their angular displacement in a fix position once such angles are chosen for a specific design configuration.

The central facet containing the low to high beam light elements has its normal line to its surface always oriented forward in the direction of the vehicle motion and slightly converging with the other headlamp on the vehicle at a distance of 100 to 200 meters towards the center line of the road. This central facet may also be equipped with, or construed as a parabolic, elliptic or other light reflector-concentrator element and may have attached one or more optical lenses in order to obtain the light collimation necessary for this facet to produce a high intensity beam (long beam). Each of the facets of this flower-like structure containing multiple light emitting devices, have their illumination parameters of intensity and direction independently controlled by a processor unit. A multitude of photo-sensors, video camera, accelerometers position encoders and possibly human behavioral sensors are connected to the input ports of the processor after passing through signal conditioning circuits.

Each facet containing the light emitting devices also contains an appropriate number of LED or laser driver components accordingly chosen to match the characteristics of the light device used, which drivers shall provide the inputs for current control, PWM and enable signals thus facilitating the independent operation of each light emitting device.

The main constructive, functional objectives and intended method of operation in this application for which the claims are made, are enumerated below:

a) To create a single physical asymmetric-geometry body containing the automatic light emitting system LEDs/Laser, built as a headlamp assembly which is applicable to any type of vehicle (terrestrial, nautical or airborne) and providing for all the front illumination, direction signaling lights, distress signaling and also providing rear-end signaling and reverse driving light controls, b) To automatically control the headlamp light intensity and direction in order to create an adaptive illumination system which responds to the environment illumination conditions, to produce a constant and uniform selective omnidirectional illumination over the whole scene ahead without high contrast zones or penumbra for increased visibility, reduced fatigue and to facilitate a faster driver response to encountered obstacles appearing in front and from the sides and compensate for glaring sources of light, c) Create a motion free, around the curve illumination with adjustable parameters of intensity and direction without the driver's intervention and without compromising the forward illumination, d) To considerably reduce or eliminate the glare to the incoming traffic by automatically controlling the emitted light rays through reducing the intensity of the Left face/module (in right-side driving countries) or of the Right face/module (in left-side driving countries), e) To provide automatic light intensity control between low beam and high beam levels with adjustment for daytime driving conditions, f) Allowing for selective change of the light spectrum of the emitters for best propagation in various atmospheric conditions (ex. worm white in fog conditions), g) Allowing for the change of the light spectrum of the emitters for the purpose of creating the yellow color used in direction change signaling and the red color used for distress signaling, h) Seek the elimination of back-dazzle by automatically controlling the upper illumination (cut off effect) in fog, rain, snow or dust conditions without diminishing the road signs visibility, i) Having the required changes for the Left or Right side driving countries easily selected by a hardwired switch, j) Automatic detection of sudden speed reduction by using accelerometers which will trigger the blinking distress red lights to alert the other drivers in order to avoid rear collision k) Provide an automatic microprocessor control of the light beam vector characteristics of intensity and directivity independently controlled in five spatial directions (other number of spatial zones may be considered); Front, Left-Right and Up-Down l) Automatic adjustment Low to High beam with continuous variation of light intensity between levels, and progressive increased illumination as surroundings go darker m) Provide wide spatial area of illumination coverage with constant photometric characteristics no penumbra and no high/low contrast in the illuminated areas n) Facilitate the conceptual principles leading to the design and construction of a novel, single light for reverse driving, having a wide angle 2 Pi Sr. illumination with a centered video camera, and also containing infrared sensors for body detection with an alert for safe backup o) Automatically control the light rays direction to illuminate the Left or Right curve in advance by using accelerometer functions of detecting the motion in the X, –X plane perpendicular to the longitudinal axis of the vehicle, p) To automatically start the distress lights when the vehicle encounters drastic deceleration as is detected by accelerometer(s) on its Y, –Y axis along direction of motion, (dY axis response along the travel course). The trigger limit may be set for speeds (v) below v=40 mph or any other limit and processed by a controlling ds/dt algorithm, (ex. distress lights are triggered by fast braking from speeds higher than 40 mp, or when sudden stops occur), q) By using the input from accelerometer sensors on its X,–X axis, the system response is directed to provide additional curve illumination when Left or Right turn is detected (dX axis motion detection) by increasing the light intensity vectors (200) at Left and Right modules/facets, r) To maintain road illumination even during high vertical swings which will increase light intensity vectors (200) at the Down module/facet, by using the Z, –Z vertical axis signal of the accelerometer (dZ axis motion detection)

s) To integrate the use of infrared sensors and/or video camera located within the headlight assembly for enhanced detection and night vision of warm bodies t) In extremely high incoming light conditions the high beam is increased in intensity for a selective front direction only hence aiding visibility mainly in the frontal and right direction while reducing driver blinding and guarantee sufficient light conditions to continue driving in a safe manner u) To facilitate easy integration with voice activated light commands given by driver v) Providing a Manual override switch for emergency or for system fail situations The following explains the construction and the operational principles on which the claims are founded and is understood that such claims shall be considered to include any and all of the implicit theories, construction, technology and functionality as presented within this text.

An asymmetric geometry headlamp concept designated for vehicular external illumination was designed to produce light with adaptive parameters of luminous intensity and direction (the magnitude and the angle of the light vectors) and to provide multiple modes of operation pertaining to direction change signaling, distress signals and security features as it is introduced by this application. The asymmetric design of the light emitting system may be understood as a geometric body having the property to generate light in all desired directions by using arrays of emitting devices placed on its various surfaces named facets or modules, which facets are situated at various angles in relation to each other so that the total illuminated area will cover a 2 PiSteradian solid angle.

The asymmetric geometry design of the headlamp is depicted in detail in FIG. 2 and FIG. 3, which guarantees the luminous effects and patterns contemplated in this application as shown in FIG. 4, FIG. 5 and FIG. 6.

The shape of the headlamp is determined by the surface area and the angular orientation of the respective facets which may be customized for every individual type of vehicle. The terminology further used within this text will make reference to facets when describing geometric constructive parts of the headlamp and will use the term module when referring to the whole assembly of the facet geometrical structure including the light emitting devices and their driver control circuitry viewed as an integral unit.

The design relies on the principle of dividing the vehicle illumination pattern into five or more independently controlled illumination zones as being defined by the five (or more) facets of the angular geometry of the headlamp body. Each facet of the headlamp is equipped with a multitude of LEDs and/or Laser emitters which are forming independently controlled zones of illumination and signaling. All the illumination parameters of intensity, directivity and spectrum are controlled by a microprocessor and no moving parts or actuators are employed in the construction of this headlamp.

A series of photoelectric (ALS) and/or video sensors produce the feedback signals used in controlling the intensity, directivity and color spectrum of the light patterns generated by the LED/Laser emitters.

A group of accelerometers and angular encoder sensors provide the feedback signals within the control loop addressing the sideway illumination, the direction change signals and also trigger the automatic hazard signaling.

A simplified schematic of the microprocessor control system and the connectivity to sensors, drivers and the light emitting device assemblies are shown in the block diagram of FIG. 1.

A power supply regulator (105) receives the electrical power from the vehicle battery (117) through the intermediary of a key switch (118) which may be electronic or mechanical, and regulates its voltage and limits the current to the levels required by the control circuitry.

The control system is comprised of a microprocessor (102), clocked by an oscillator (116) and powered through the vehicle key (115). A series of sensors, namely represented by accelerometer/s and position encoder(s) (106), photo-detectors and/or video cameras (104), are connected to the microprocessor control system.

A digital and analog microprocessor interface circuitry is represented by a series of signal conditioning amplifiers (113), analog to digital converters (112) and logic gates (114), are connected to the input/output or I/O Bus, (I/O 0 to I/O 3) providing the input feedback from photo-sensors and/or video cameras and the logic controls functions to the microprocessor.

The LED/Laser devices (103) are driven by Drivers (107, 108, 109, 110, 111) and are controlled by the logic Enable Bus (EN1 to EN5) which select the direction of illumination namely Center, Up, Down, Left and Right, while the pulse width modulated bus PWM-Bus (PWM1 to PWM5) outputs the signals necessary to control the luminous intensity of the emitting devices (103).

The light emitting devices (103) and photo-sensors (104) for the planar design (in this example) configuration are assembled on an asymmetric geometry printed circuit board depicted in FIG. 2 which contains the support and heat dissipation structure (101) which is divided in five or more facets (Center, Up, Down, Left and Right in this example) each facet plane being situated at different angle in relation with the others as depicted in the top and side views. The angles of the Left, Right and Down facets are such oriented so that the normal light vectors (200) to each facet create a divergent direction of propagation of light rays which are meant to extend the field of illumination to the maximum of 2 PiSteradian. The Upper facet is angled forward such that its normal light vectors (200) are convergent with the Center facet illumination vectors (300) in front of the vehicle and by such limiting the upper back-dazzle and reducing the glare effect.

The angle at which the headlamp facets are disposed are calculated accordingly to the emitting devices optical characteristic graph of luminous intensity (I) vs. theta angle (Degrees) and serve the purpose to generate a wide and uniform spatial light distribution pattern. The facets may be planar of curved to form a concentrator-reflector of a spherical, cylindrical, ellipsoidal parabolic, hyperbolic geometry, or of any combination thereof. These components are enclosed in a headlamp housing (120) which is protected by a transparent antiglare front cover. The interior surface of the headlamp housing (120) is clad with a reflective substrate that captures the indirect rays of light and contains them within a limited frontal area.

Drawings in FIG. 2 and FIG. 3 show the geometrical configuration of the five facet embodiment, the angle of displacement of each facet in relation to the Center facet. The Left, Right and Down facets are tilted backwards so that a wide angle of luminous dispersion is obtained as shown in FIG. 3, by the divergent light vectors (200). The Center facet is designed as a light concentrator and may contain a reflector (122) of the shapes mentioned above, clad with a reflective coating and having a front lens (119) with a long focal point such calculated to produce a fascicle of quasi-parallel rays (300) serving as a high beam when the PWM factor is adjusted above 90% duty cycle or is configured as a low beam when PWM factor is controlled to be at 60% or lower.

The lens (119) is optional and may be eliminated when high power Laser emitters requiring collimation, are used. The embodiment of the Central facet shown in FIG. 3 contains a forward direction light lens (119) and a reflector body (122) with a center mounted reversed multifaceted pyramidal support (123) where the emitting devices are assembled on each facet of the pyramidal support at such angles so that the converging light vectors (300) are aligned in a quasi parallel disposition for the purpose of delivering a long/high beam with a low dispersion factor. LED and/or Laser emitters may be used in this design in which case a series of supplementary human protective methods would be invoked.

The Up facet(s) is tilted forward toward the symmetry axis at an angle which is determined by the LED manufacturer's graph of Intensity (I) vs. angle [I=f(Angle)], such that a uniform wide angle of luminous dispersion is obtained by superimposing light fields from all emitters as it is shown in FIG. 10, by the divergent light vectors (200), which by projecting the light rays downwards creates a cut-off line that limits the glare for the incoming traffic but will not reduce the road sign visibility.

The flowchart in FIG. 7 describes the functionality of the microprocessor control system in accordance with driving conditions and the information received from multiple sensors.

At the time the contact key is inserted and turned in the first position, the lighting control system is energized and the microprocessor runs its register reset routine, checks the sensors output voltage range and runs a calibration check program. The light/video sensors for left side and right side driving conditions are selected manually and depending by the If-Then=YES condition a day time run routine is set for controlling the day light headlight intensity and turns on the position lights. Otherwise, when If-Then=NO, the microprocessor runs its night time routine when the intensity and direction of illumination vectors are automatically controlled with feedback signals received from the light/video sensors and from accelerometers and/or position encoders. In case that incoming traffic is detected per FIG. 9, the left facet/ module illumination vectors (200) for right-side driving countries, or the right facet/module illumination vectors (200) for the left-side driving countries are reduced in intensity, while simultaneously the front facet/module reduces its intensity vectors (300) to low-beam standard. The right facet/ module remains adjusted at its higher level intensity vectors (200) to guarantee a full field of visibility to the right (for right-side driving standard) and to the right direction curving roads.

For driving on multilane roads, both left and right facets/ modules will dim their side illumination vectors (200) to comfortable intensity levels per FIG. 6, while the front illumination vectors (300) in FIG. 9 are automatically and continuously adapted in intensity from low to high beam status accordingly to the incoming traffic vehicular light detected.

In single car on the road driving conditions, the illumination is set at its maximum levels in all directions with all five facets/modules operating close to 100% intensity as shown by the illumination pattern in FIG. 5. In this scenario the visibility extends to its widest angular aperture of approximately 2 PiSteradian (~180 linear degrees), with a peripheral depreciation of not more than 30% at the margins.

The use of video arrays or video cameras within the light feedback control loop allows for early detection of subjects situated on the road beyond the limits of the visible light field, by sensing the IR (infrared) spectrum of the subject (invisible to the human eye) and forcing the headlamp into its maximum intensity of visible spectrum in response. This early detection IR system may be fixed or adjustable in range, to cover the center of the road ahead or the whole solid angle of 2 PiSteradian the headlamp is capable of illuminating.

The block diagram in FIG. 1 shows the main electrical connections of the headlamp system from the power supply to light emitters, including sensors and the microprocessor's most important ports and peripherals. An information display screen may be attached to create a user interface access to the system's functions. It is beyond the scope of this application to present a detailed operation of the microprocessor based control circuitry and its associated sensors. The purpose of this diagram is to describe the main block components of the system for the purpose of understanding the construction and operational fundamentals used by this design concept.

An ON/OFF switch (118) supplies the battery power to the circuitry through the intermediary of a Volt/Current stabilized power supply and regulator module (105) providing the desired voltage level for the interface circuits, microcontroller (102) and the LED driver circuitry (107) (108) (109) (110) and (111).

A manual override switch (115) is provided as a safety solution in case of system fault or errors, which when activated returns the main control operations of Low/High beam changing and signaling lights to the driver.

When the Power ON is activated through switch (118), the microcontroller is reset and its active memory deleted of any prior settings generated by the program's run-time algorithms.

All the sensors connected to the I/O bus are checked against calibration preset values and their actual signal is then conditioned and sent to their corresponding input ports at the microcontroller (PIC18 microcontroller or other suitable type may be used). Other preliminary conditions are set in hardware for Day/Night status and used for the PWM threshold levels which are then compared with the light sensor signals to determine the proper illumination level outputted by the light emitting LEDs located in the headlamp modules in order to generate a certain luminous intensity. If incoming traffic is sensed, the Left side of the head lamps (for Right side driving countries) is turned Low by PWM 1 to 4 circuitry acting on intensity vectors (200), thus reducing the blinding effect to the opposite traffic, as seen in FIG. 9. Simultaneously, the Right side and the DOWN section of the headlamps are turned High at PWM>90% providing full illumination of the right side of the road with minimum effect over the left side or to the incoming traffic.

The photo-sensors continuously evaluate the luminosity of the path ahead and adjust to lower or higher levels the UP and CENTER sections of the headlamps acting as a proportional and compensative luminosity control, for improved visibility.

During the normal night driving conditions, all sections of the headlamps UP-Down-Left-Right and CENTER are lit dispersing light over a 2 PiSteradian area with uniform intensity over the whole scenery as seen in FIG. 8. There are no spots of high luminous intensity in this omnidirectional lighting system hence the stress on the eye is eliminated. Consequent to the continuous light intensity and direction control of this system, the driver becomes early aware of the obstacles ahead and his reaction time is dramatically reduced.

The SAE standard does not require an upper cut-off for the Low Beam light but this application provides for such capability by selecting the initial set angle of the UP facet of the headlamp assembly.

In order to conform to the SAE and ECE standard recommendations, the LEDs (103) are selected to radiate light in the Cool-White spectrum, and the headlight back-dazzle effect is done by adjusting the angle of the UPPER facet along with light intensity control.

Each LED headlamp module is driven by specialized LED driver circuits (107) (108) (109) (110) and (111), having individual inputs for PWM1-4 (Pulse Width Modulation) and EN1-4 (Driver Chip Enable) to enable individual modules, each signal being provided by the PWM Bus and EN Bus, of the microcontroller output ports P0 through P7.

Two or more Left and a Right photo-sensors (ALS) (104), are situated on the LEFT and respectively RIGHT modules of the LED headlamp assembly but not necessarily situated within the assembly in order to avoid light interference effects, and are having the role of detecting the outside illumination level and provide a proportional signal to the luminous intensity control circuitry. The same signals received from photo-sensors (104) are separately amplified (113) and converted from analog to digital by the A/D converters (112), then applied to an "AND" logic gate (114) for USA or EU (Europe) driving standard selection, done through the Country Selector switch and applied to the I/O3 port programmed as digital input.

The analog signals from the Left and Right photo-sensors after proper amplification by AMP 1 (113) and AMP2 (113) are connected to the, I/O1 and I/O2 ports which are programmed as analog input channels designated to process signals with a continuous variation in time.

The High Beam is generated by the CENTER module which is driven by LED driver (107) and is equipped with a number of reflective poly-parabolic shapes and condenser lenses used to concentrate the light into a narrow spot shooting at high distance, which section is also controlled by the PWM4 modulator controlling the high intensity of the Low to High beam levels on a linear response characteristic. As seen in FIG. 11 the high beam has a narrow focused and intense distribution of its light vectors (300) in relation with the frontal view angle while the low beam vectors (200) are divergent and present a wide angle of illumination covering almost 2 PiSteradian of a solid angle (approximately 180 Deg. in linear angular measurements). A polar representation of the low and high beam intensity vs. the angle in Degrees, shown the intensity of light distributed accordingly with the angle of the light vectors referenced symmetrically from the center of the vehicle to −90 and +90 Degrees range as depicted by FIG. 12. The light intensity and direction of the light rays are both continuously adjusted so that the eye is not exposed to sudden changes in luminous intensity hence eliminating the eye adaptation time inherent in standard headlamp designs.

Accelerometer(s) (106) connected to the analog port I/O0 of the microcontroller, detect changes of direction in the horizontal plane along X, −X axis for Left-Right vehicular motion and accordingly will generate a signal to increase the side illumination in the direction the change occurs. This in-curve illumination is part of a programmed predictive control system routine, is fully automated and controlled by information received from accelerometers and/or light detectors (104) and does not imply any electromechanical or mechanical actuation or motion.

Changes along the Y,−Y (along traveling direction) axis detected by the accelerometer(s) (106) will indicate an acceleration or deceleration of the vehicle. A sudden and high rate of deceleration (ex. during a strong and sudden braking, or deceleration determined by frontal impact) will trigger the distress red light blinking signaling alerting the other drivers. A built-in differential circuit alerts for fast deceleration which is then referenced to a preset differential value for speed $dv=v_2-v_1$ (where $v_2$=cruising speed of vehicle, and a fixed $v_1$~40 mph speed reference) at which moment the distress lights will start flashing red light in order to alert the rear traffic about critical drop in speed and/or fast deceleration conditions. It is understood that the change of direction signaling remains completely under driver's manual control at all times, but it may be automated if used in ROV (remote operated vehicles) applications.

A direction change signal initiated by the driver of the vehicle will override an earlier activated distress signal for the duration of signaling so that there will be no confusion about the driver's intention to indicate the change in driving direction.

Three-axis accelerometers having a third degree of detection along Z, −Z axis (vertical plane), may be used to maintain road illumination even during high vertical swings and such functions may be associated with other performance factors of the lighting system as they could become desirable at a later time.

Figure 1:
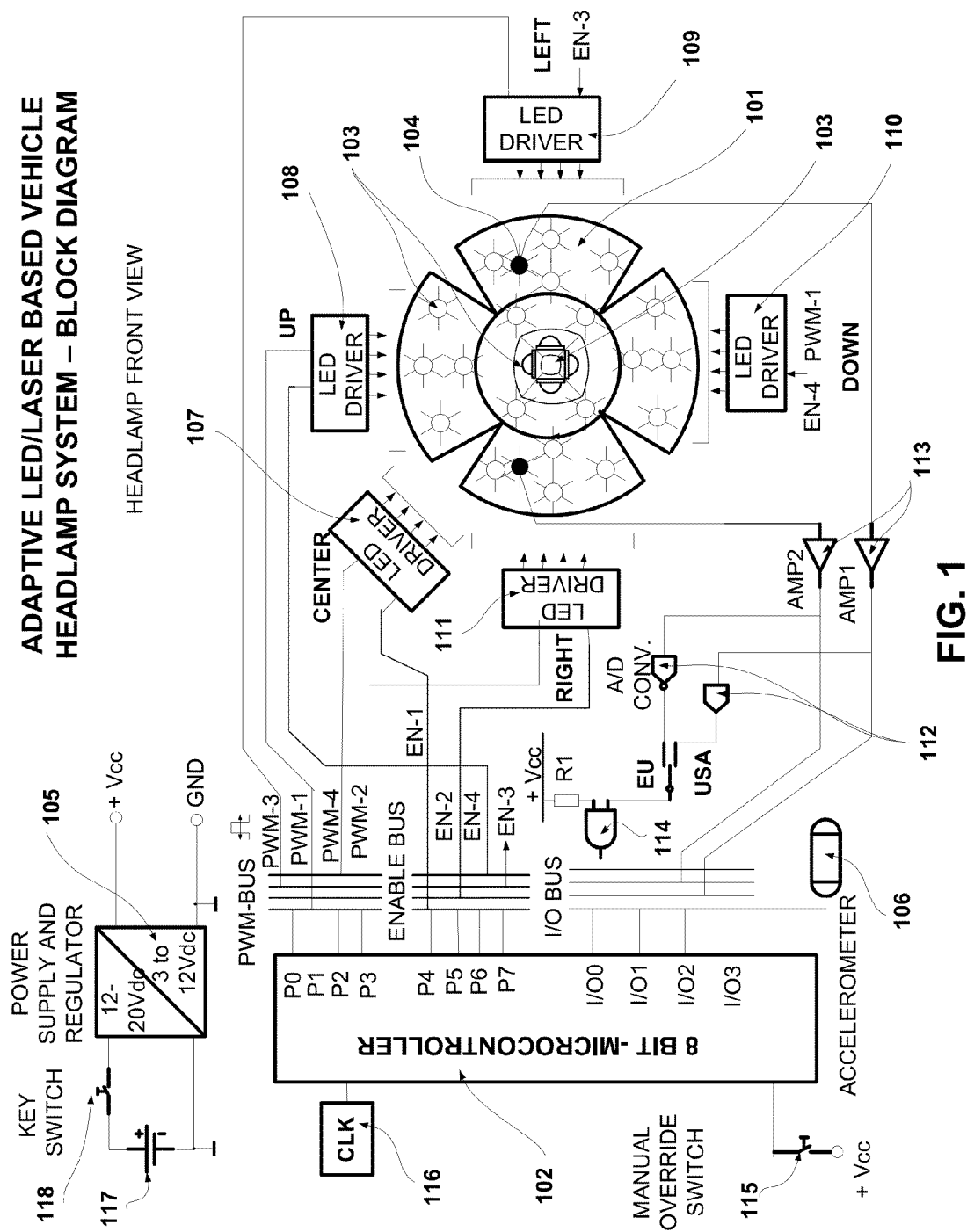
FIG. 1 ADAPTIVE LED/LASER BASED VEHICLE HEADLAMP SYSTEM—BLOCK DIAGRAM, displays the block diagram of the adaptive illumination system, including the main electronic control circuitry and the emitter assembly with a general indication of the variable geometry concept applied in this application.
Figure 2:
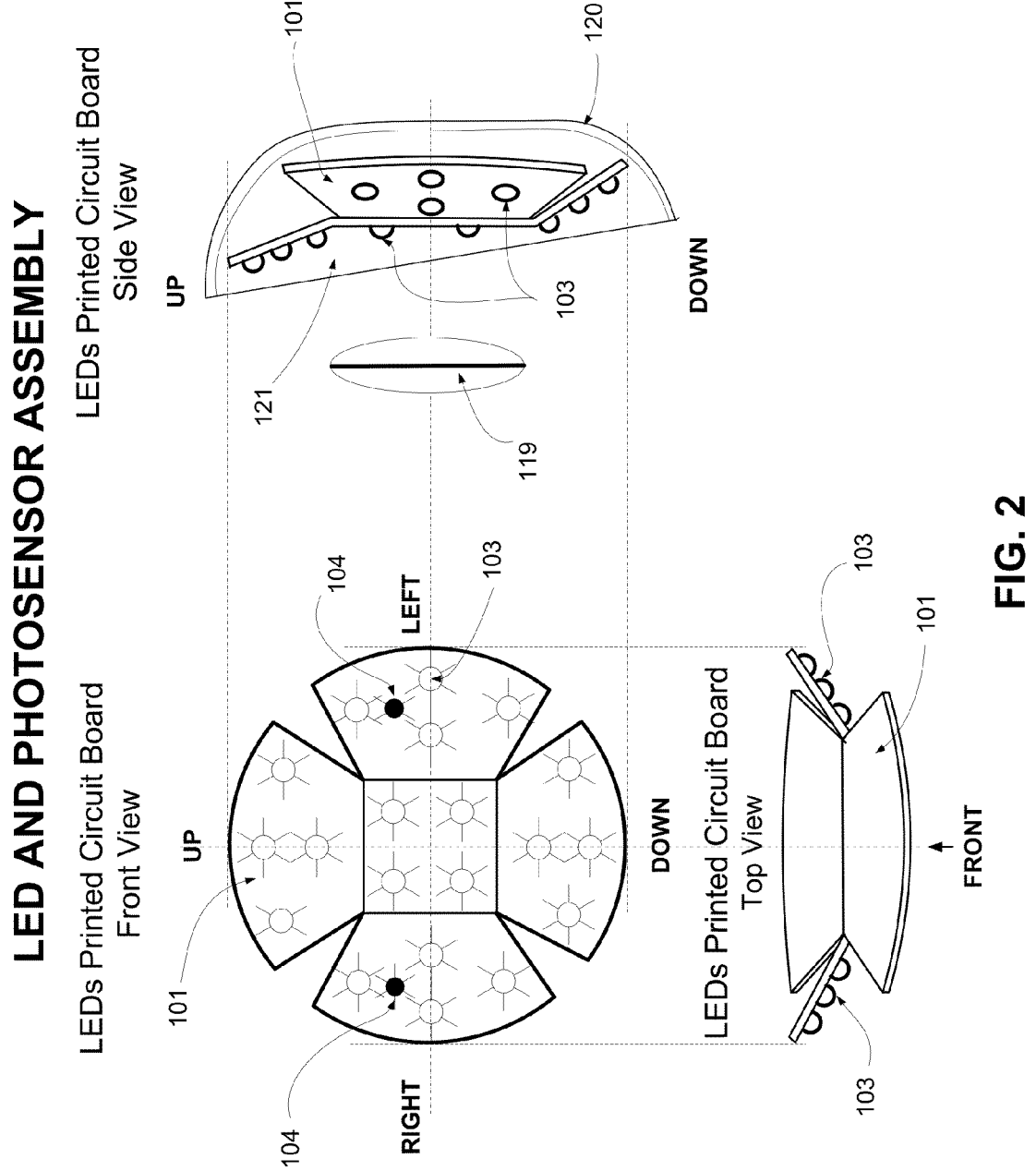
FIG. 2 LED/LASER AND PHOTOSENSOR SUBASSEMBLY, shows the LED emitting assembly with front, side and top views, the LEDs relative position and number and a sketch of the concentration lens(s) or collimators with reflective casing as a simplified concept.
Figure 3:
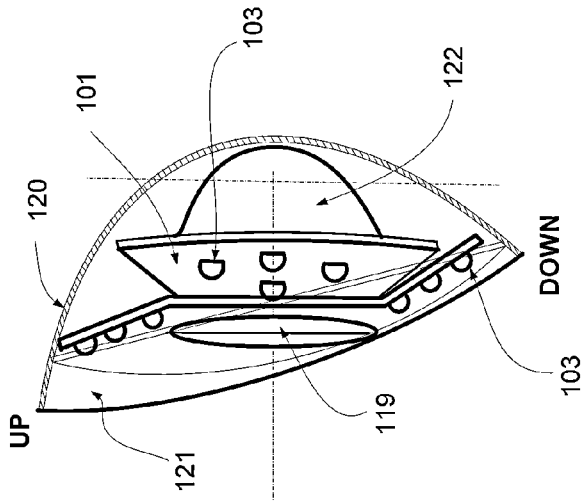
FIG. 3 OVERVIEW HEADLAMP ASSEMBLY WITH INTENSITY VECTORS SHOWN, showing the facets with LEDs and the center quasi-parabolic reflector with lens, used to create the High beam pattern.
Figure 3:
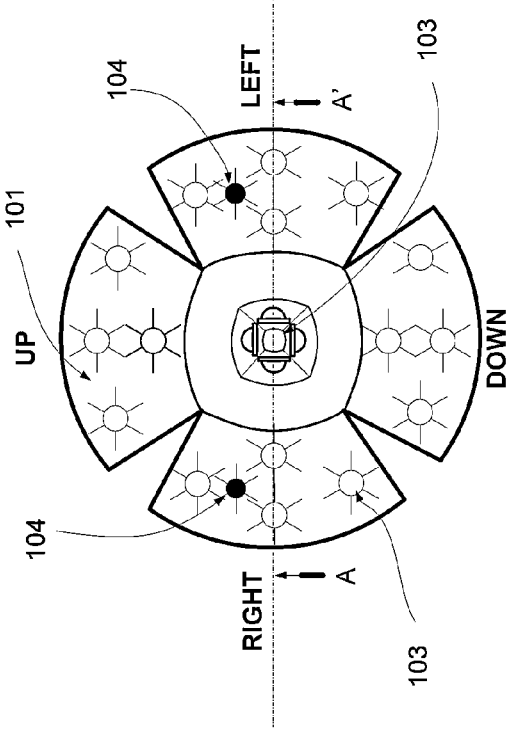
Figure 3:
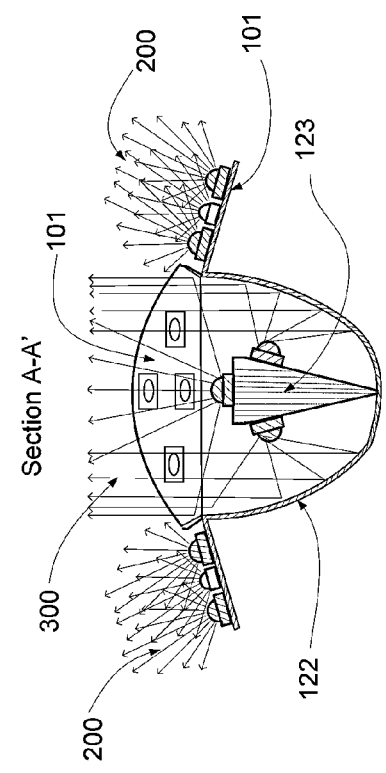
Figure 4:
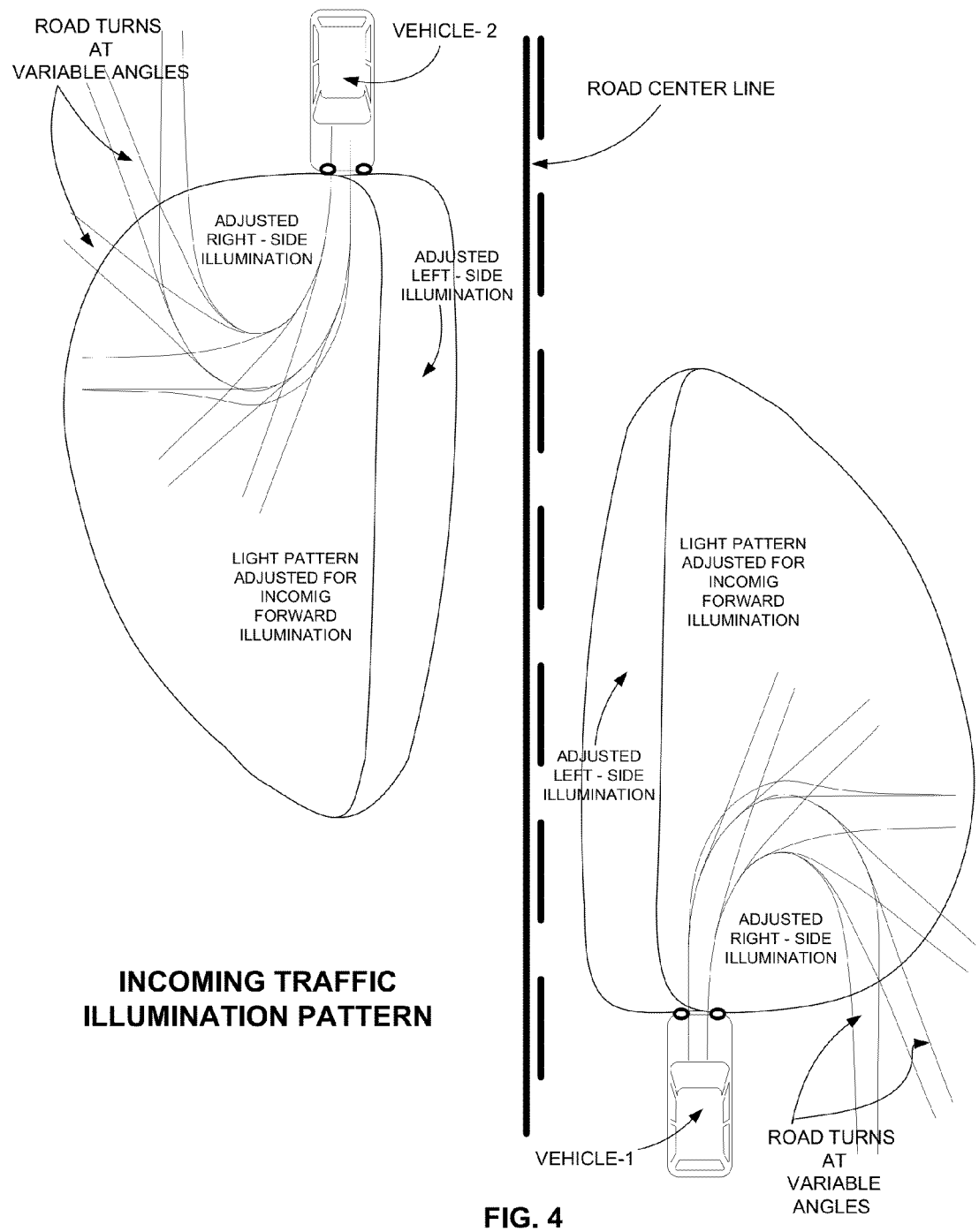
FIG. 4 INCOMING TRAFFIC ILLUMINATION PATTERN, shows the illumination pattern of the herein system indicating the visibility area as it is adjusted for incoming traffic situation.
Figure 5:
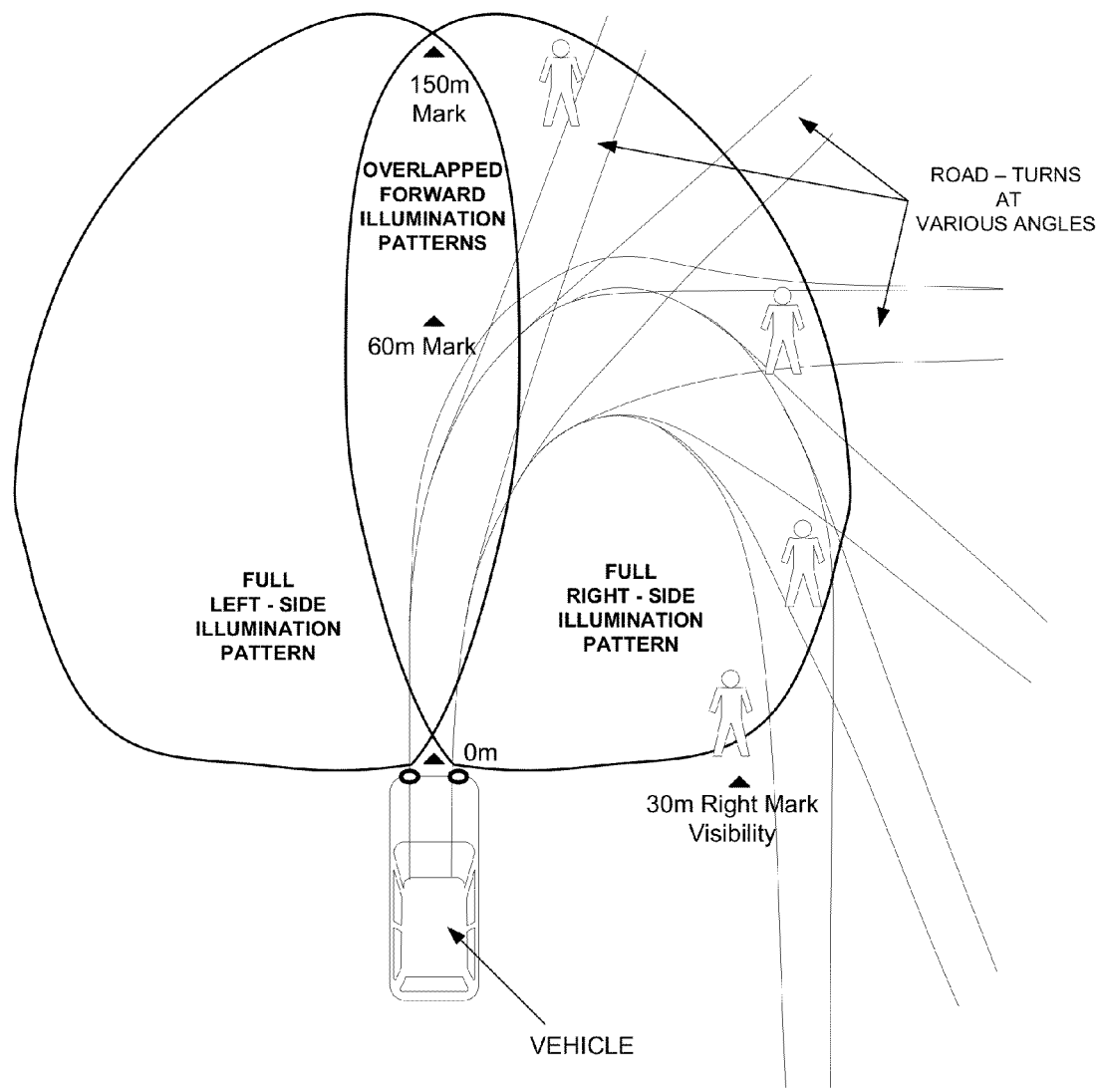
FIG. 5 SINGLE CAR ILLUMINATION PATTERN—NO INCOMING TRAFFIC, shows the extended illumination pattern for a single car on the road of the herein system when in full illumination operation.
Figure 6:
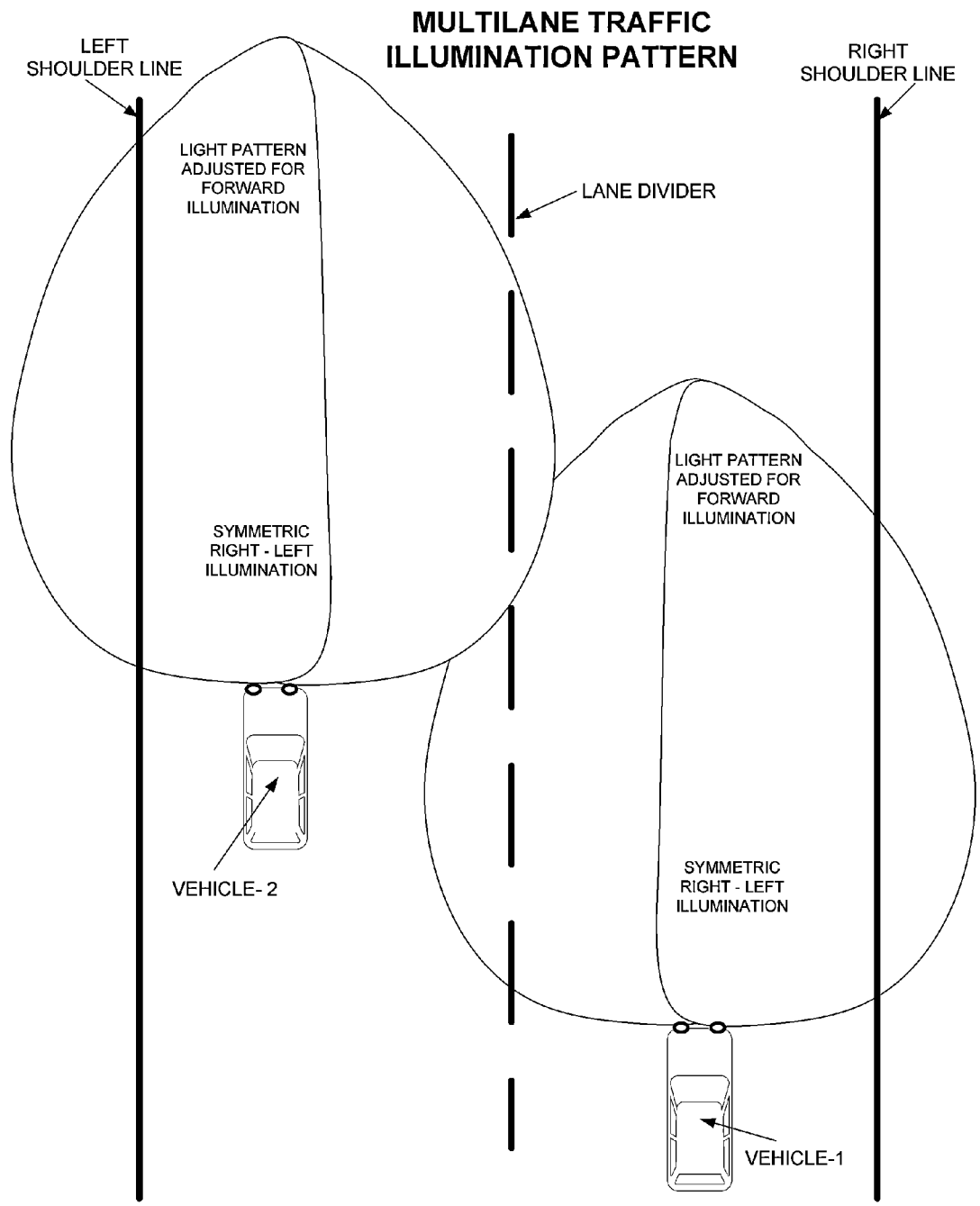
FIG. 6 MULTILANE ILLUMINATION PATTERN showing the light distribution patterns of two vehicles driving parallel on a multilane lane road.
Figure 7:
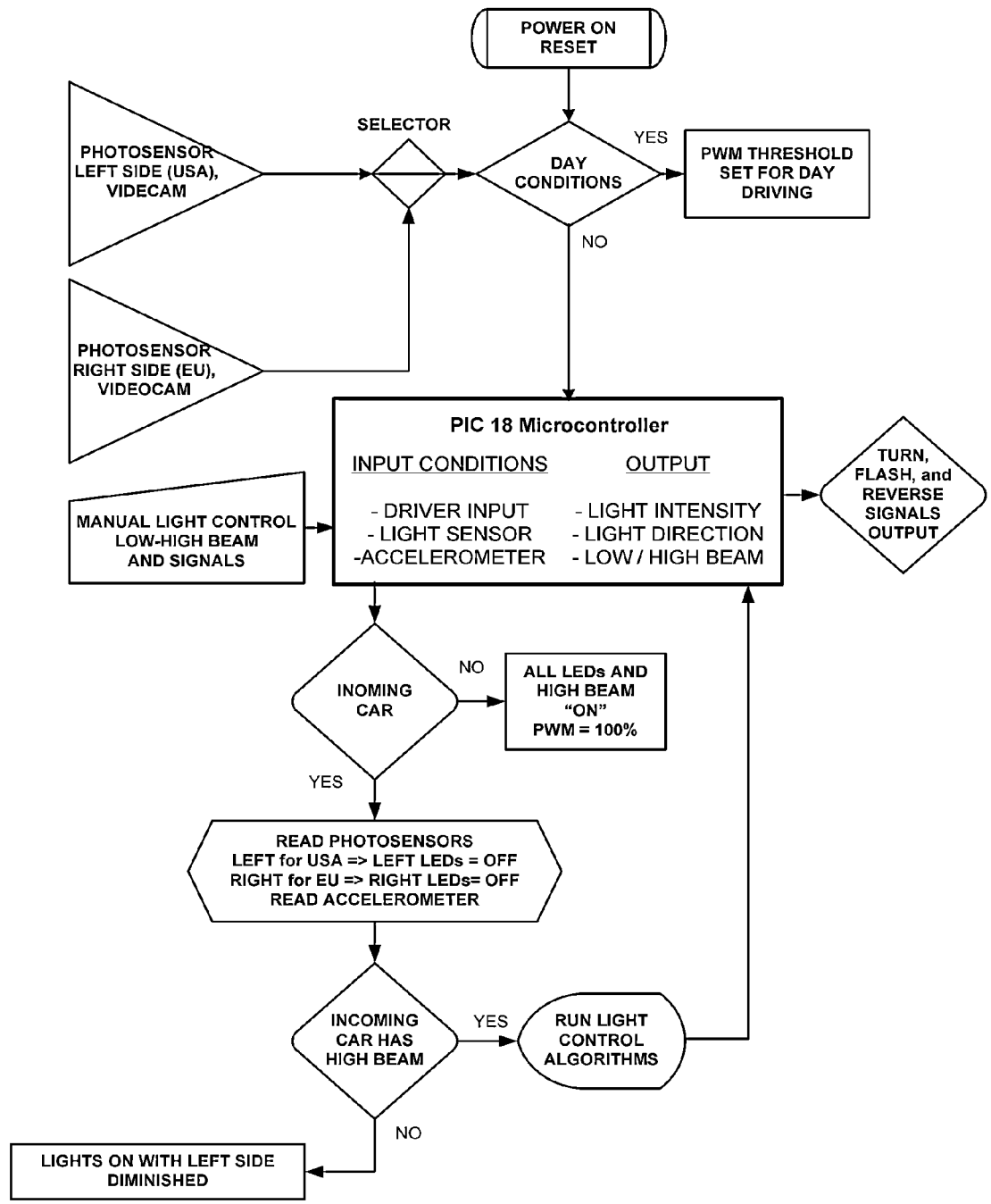
FIG. 7 OPERATIONAL FLOW CHART, representing the flow diagram of the basic principles of operation and the functions performed by the microprocessor based control circuitry.
Figure 8:
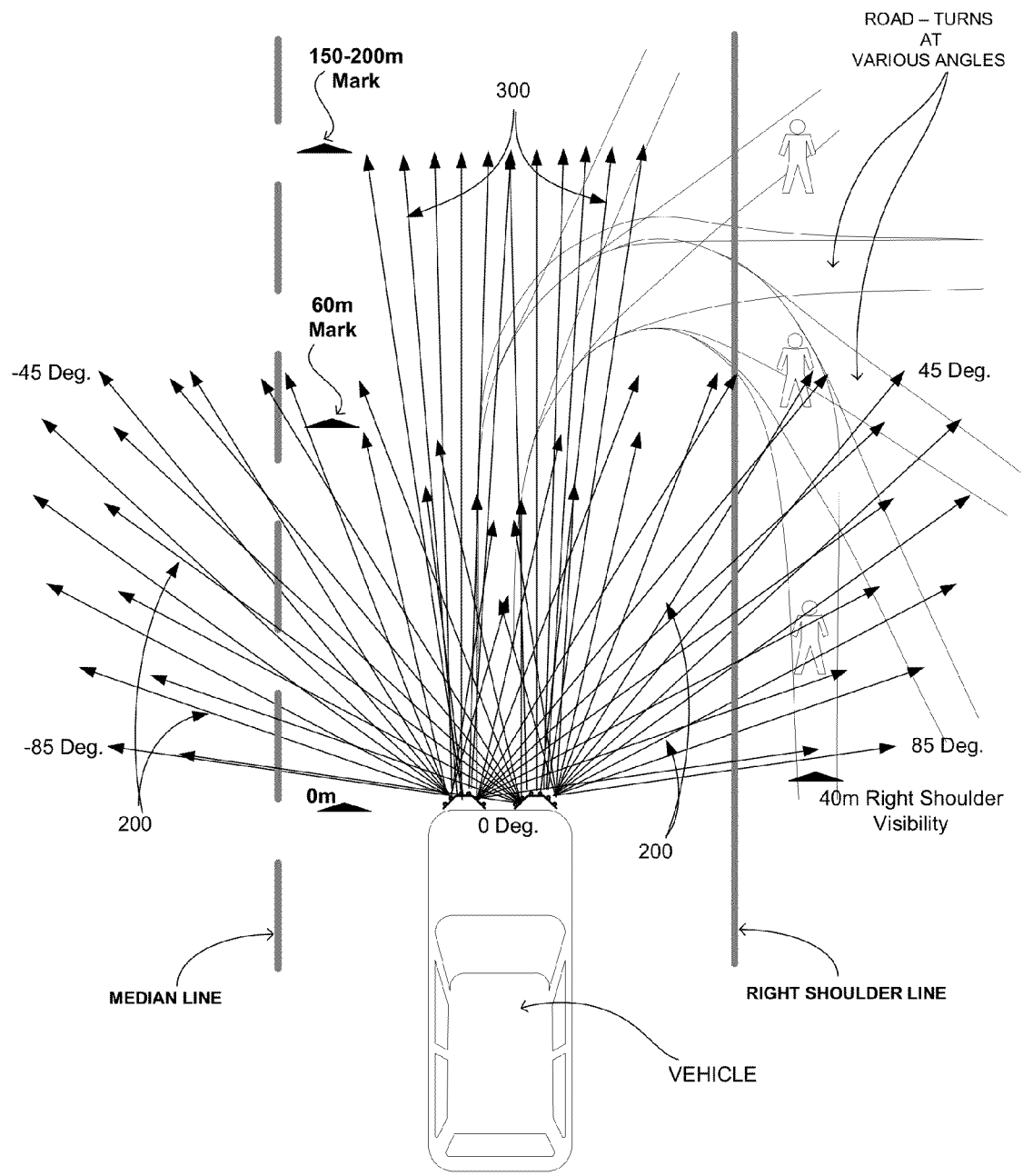
FIG. 8 LIGHT INTENSITY VECTOR REPRESENTATION FOR A SINGLE CAR, NO TRAFIC condition depicting the main light vectors (200) and (300) with their directional (angular) displacement in full illumination.
Figure 9:
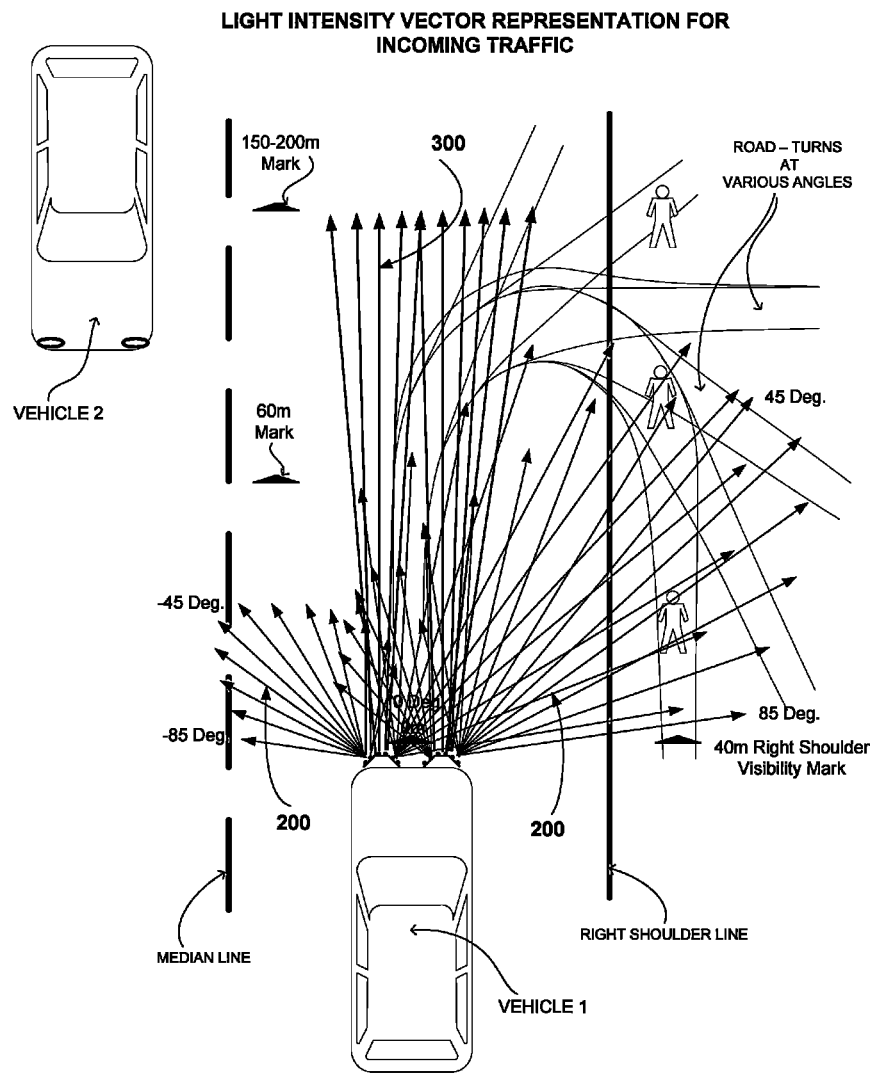
FIG. 9 LIGHT INTENSITY VECTOR REPRESENTATION WITH INCOMING TRAFFIC, depicting the reduced vector intensity (magnitude, not the angle) of the Left facet of the headlamp, in the presence of incoming traffic.
Figure 10:
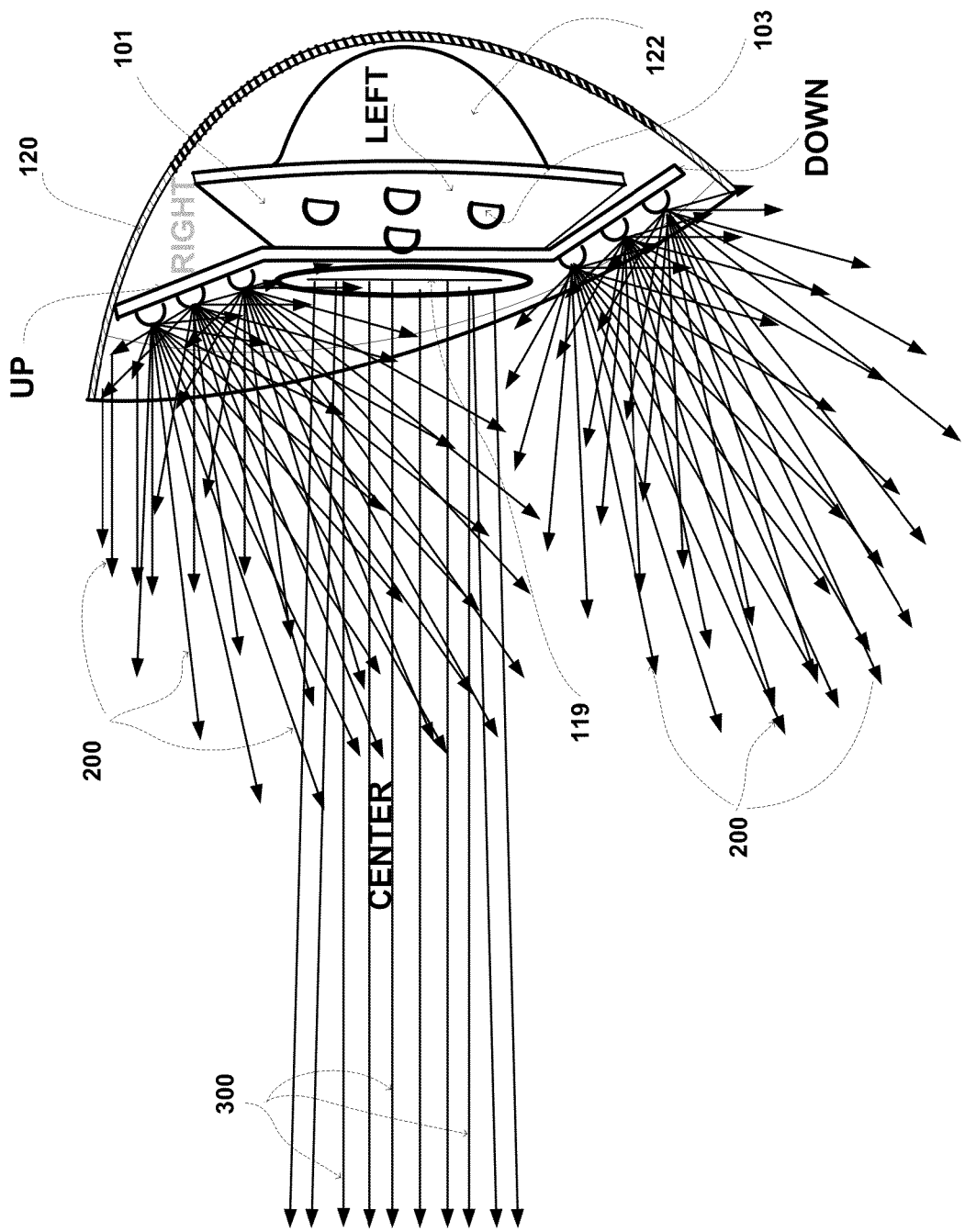
FIG. 10 SIDE VIEW OF THE HEADLAMP LIGHT VECTORS, as viewed from the side of the of vehicle.
Figure 11:
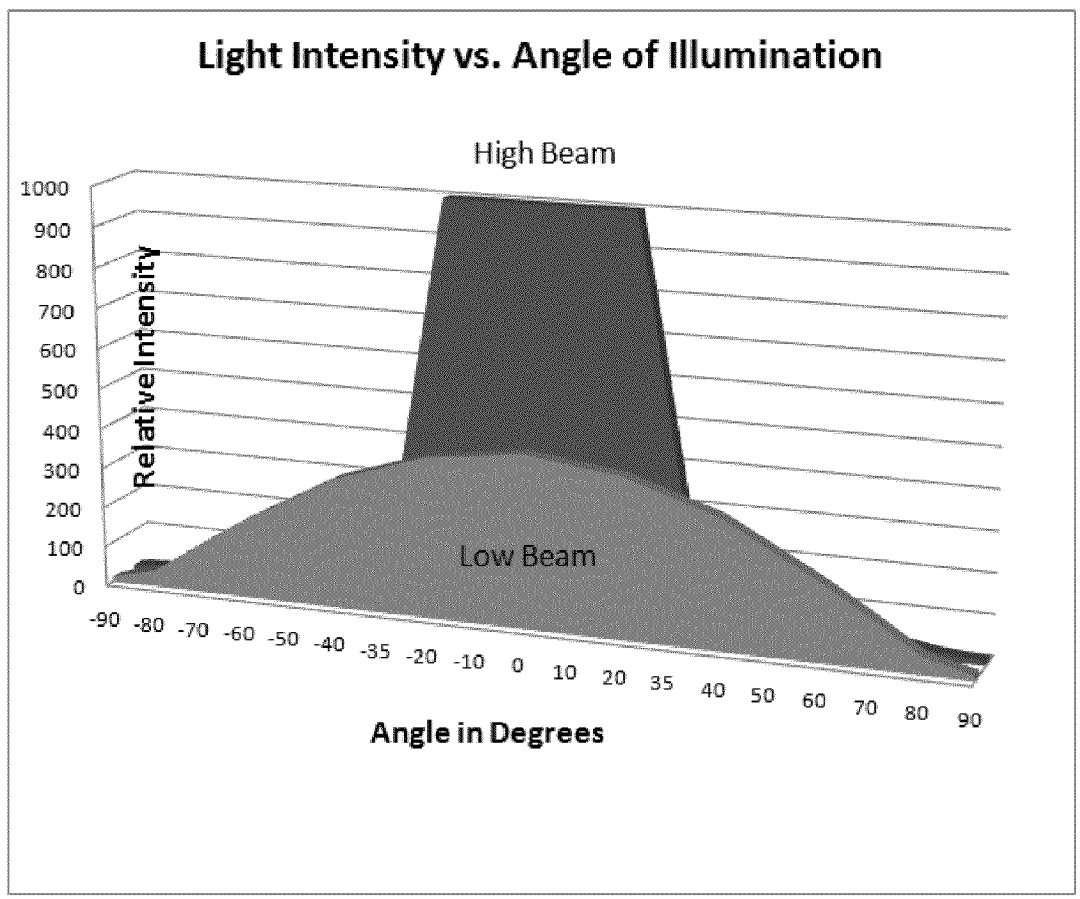
FIG. 11 LIGHT INTENSITY vs. ANGLE OF ILLUMINATION, Cartesian graph showing the relative intensity of the light beams generated by the headlamp, in respect to the angle of view for both low and high beams.
Figure 12:
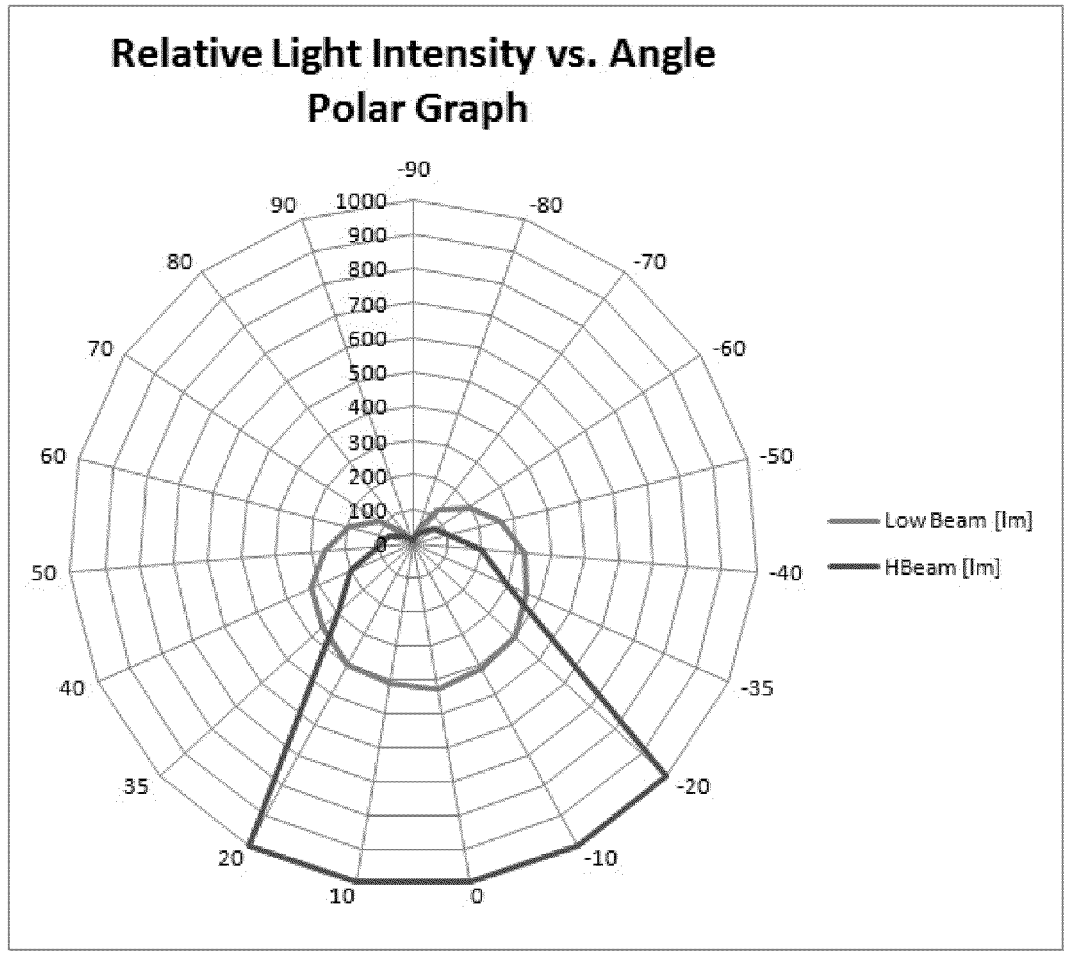
FIG. 12 RELATIVE LIGHT INTENSITY VECTORS vs. ANGLE, IN POLAR REPRESENTATION, for both low and high beam, showing the light intensity vectors at various view angles.

The invention claimed is:
1. An adaptive external vehicle illumination system of an asymmetric geometry, built as a vehicle headlamp and signaling device comprising:
a three-dimensional geometrical structure of an asymmetrical geometric configuration formed by a five or more non-reflective facets attached to a central facet in a flower-like facet construction, separated from each other and joined along the perimeter of the central non-reflective facet;
wherein said non-reflective facets are each, individually positioned at a predetermined angle in relation to the normal axis to the surface of the central facet and at least one of the said facets is oriented at an opposing angle from the facet on the opposite side in an asymmetrical configuration;
wherein, at least one light emitting device (LED) or a light amplification by stimulated emission of radiation (Laser), is assembled on the surface of each said non-reflective facet, such that the light vectors emitted are dispersed accordingly to a wide angular unfocussed non-reflective distribution, such that to generate zones of uniformly dispersed over a range from 2 PiSteradian to 0.1 PiSteradian, independently controlled zones of omnidirectional, non-reflective light emissions composed of continuous uniformly dispersed directional vector components;

a microprocessor based control system contained within the illumination system independently controls the luminous intensity vectors of the wide angle emission of at least one light emitting device assembled on the said non-reflective facets, such that they emit zones of omnidirectional dispersed light and form zones of independently controlled uniformly dispersed, non-reflective directional light vector component patterns;

wherein said microprocessor based control system is controlling the non-reflective light emitting direction, intensity and spectrum of the at least one non-reflective light emitting device independently controlled zones of omnidirectional illumination, based on the feedback signal received from electronic sensors, further comprising;

a plurality of electronic sensors, comprising; photo sensors, video sensors, accelerometers and position encoders connected within the negative feedback of the microprocessor based control system, such that the omnidirectional non-reflective light vectors emitted are angularly dispersed and varied in intensity accordingly to a wide angle, ranging from 2 PiSteradian to 0.1 PiSteradian light distribution and forming independently controlled illumination zones of non-reflective uniformly dispersed, non-reflective directional vector component patterns, and where the change in light spectrum and blinking time period is determined by an electric signals received from said sensors.

2. The adaptive external vehicle illumination system with an asymmetrical geometry of claim 1, further comprising:

said central facet comprising a combination of at least one light emitting device (LED) propagating light conforming to a wide angle light distribution non-reflective, and a light amplification by stimulated emission of radiation (Laser) having at least one optical lens providing the means for concentrating the light rays into a narrow high intensity beam, emitting light radiation in the range from 2 PiSteradian to 0.1 PiSteradian;

a headlamp housing having an interior surface, wherein said housing has a transparent front cover made of materials with low refractive indices which surrounds and follows the geometrical profile of the light emitting facets of the non-reflective three-dimensional structure formed by the five or more facets, which does not interact with the independently controlled zones of omnidirectional uniformly dispersed, non-reflective vector pattern considered within the range from 2 PiSteradian to 0.1 PiSteradian.

3. A method for a continuously adaptive microprocessor based lighting and signaling control system for vehicle illumination, comprising:

wherein, modifying the intensity and the color spectrum of at least one light emitting device in such manner that the summed effect of the light produced by a plurality of non-reflective light emitting devices may create a multitude of patterns of light varying continuously and combining uniformly over a wide solid angle within a range from 2 PiSteradian to 0.1 PiSteradian, forming independently controlled zones of omnidirectional uniformly dispersed, non-reflective vector patterns of light;

wherein the control system method modifies the emissive spectrum of at least one non-reflective light emitting device from white to blinking orange color when a predetermined value in accelerometer and position sensors is exceeded;

allows overriding the automatic control response to manual activation after the manual activation of a switch existing in vehicle for change of direction signaling is triggered;

said control system method automatically modifies the emissive spectrum of at least one non-reflective light emitting device from white to blinking alerting color upon the detection of a predetermined differential change in acceleration and resets to prior light condition after the previous speed is regained;

whereby said adaptive microprocessor based control system is continuously adjusting the vehicle headlamp luminous intensity in the range from low to high beam and the spatial distribution range covering up to 2 PiSteradians in a uniformly dispersed, non-reflective emission with directional vector components, comprised of zones of independently controlled directional light vector component patterns; and the microprocessor based control system contained within the non-reflective illumination system independently controls the luminous intensity vectors of the wide angle emission of at least one light emitting device assembled on the said facets, such that they emit zones of omnidirectional, uniformly dispersed non-reflective light and form zones of independently controlled directional light vector component patterns.

* * * * *